United States Patent [19]
Kha

[11] Patent Number: 5,428,286
[45] Date of Patent: Jun. 27, 1995

[54] SWITCHING MODE POWER SUPPLIES

[75] Inventor: Kim L. Kha, Kowloon, Hong Kong

[73] Assignee: Astec International Limited, Hong Kong, Hong Kong

[21] Appl. No.: 248,595

[22] Filed: May 24, 1994

Related U.S. Application Data

[63] Continuation of Ser. No. 960,544, Oct. 13, 1992, abandoned.

[30] Foreign Application Priority Data

Oct. 14, 1991 [GB] United Kingdom ................. 9129796

[51] Int. Cl.⁶ .............................................. G05F 1/56
[52] U.S. Cl. ...................................... 323/285; 323/222
[58] Field of Search ............... 323/222, 282, 285, 351, 323/205, 210; 363/16

[56] References Cited

U.S. PATENT DOCUMENTS

| | | | |
|---|---|---|---|
| 4,195,335 | 3/1980 | Murakami et al. | 363/49 |
| 4,672,303 | 6/1987 | Newton | 323/285 |
| 4,816,982 | 3/1989 | Severinsky | 363/44 |
| 5,001,413 | 3/1991 | Ohms | 323/285 |
| 5,001,620 | 3/1991 | Smith | 363/89 |
| 5,028,861 | 7/1991 | Pace et al. | 323/222 |

FOREIGN PATENT DOCUMENTS

| | | | |
|---|---|---|---|
| 0352983A1 | 1/1990 | European Pat. Off. | H02M 1/00 |
| 1265569 | 3/1972 | United Kingdom | G05F 1/50 |
| 1529824 | 10/1978 | United Kingdom | H05B 41/14 |

*Primary Examiner*—Thomas M. Dougherty
*Assistant Examiner*—Adolf Berhane
*Attorney, Agent, or Firm*—Coudert Brothers

[57] ABSTRACT

A switching mode power supply is disclosed in which an input voltage is modulated by a switch and the modulated waveform is passed through an inductance, rectified and filtered to provide an output of a controlled value, and in which to determine the current passing through the inductance, the smaller of the root mean square (rms) current through the switch and the rms current through the rectifier is measured by including a current measuring resistor in series with that respective component, and the current through the other component is measured by including a current-sensing transformer in series with that component, the current through the inductor then being determinable as the combination of the other two currents.

11 Claims, 2 Drawing Sheets

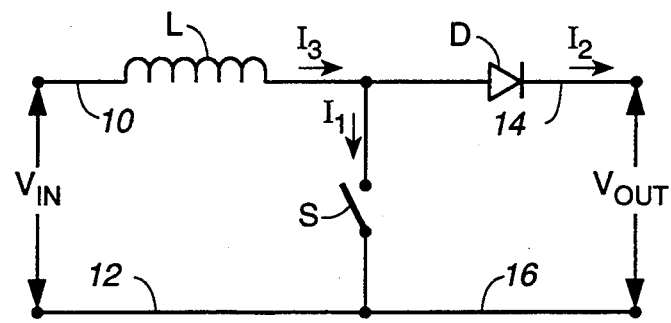
FIG._1A
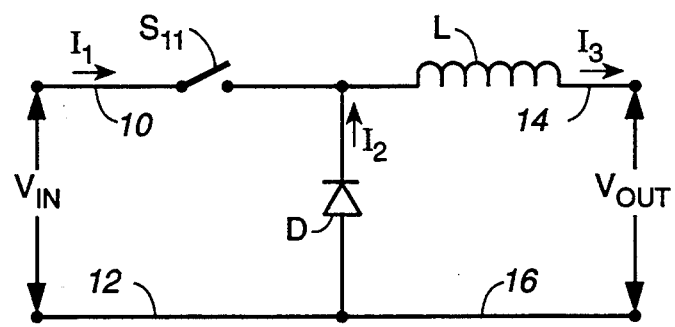
FIG._1B
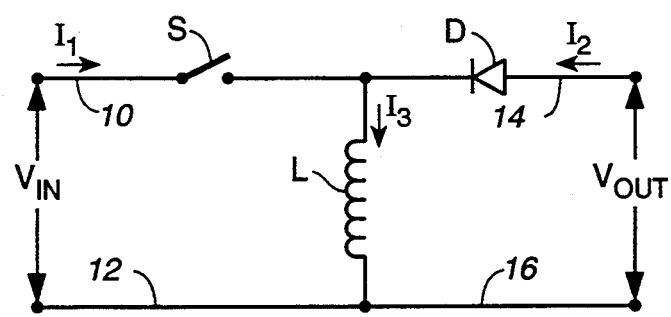
FIG._1C
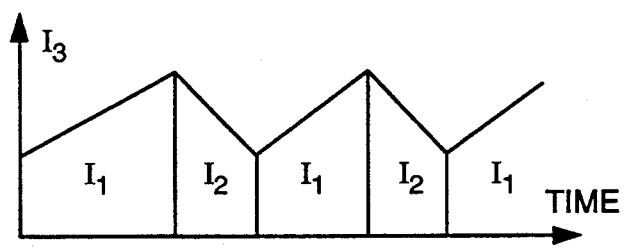
FIG._2

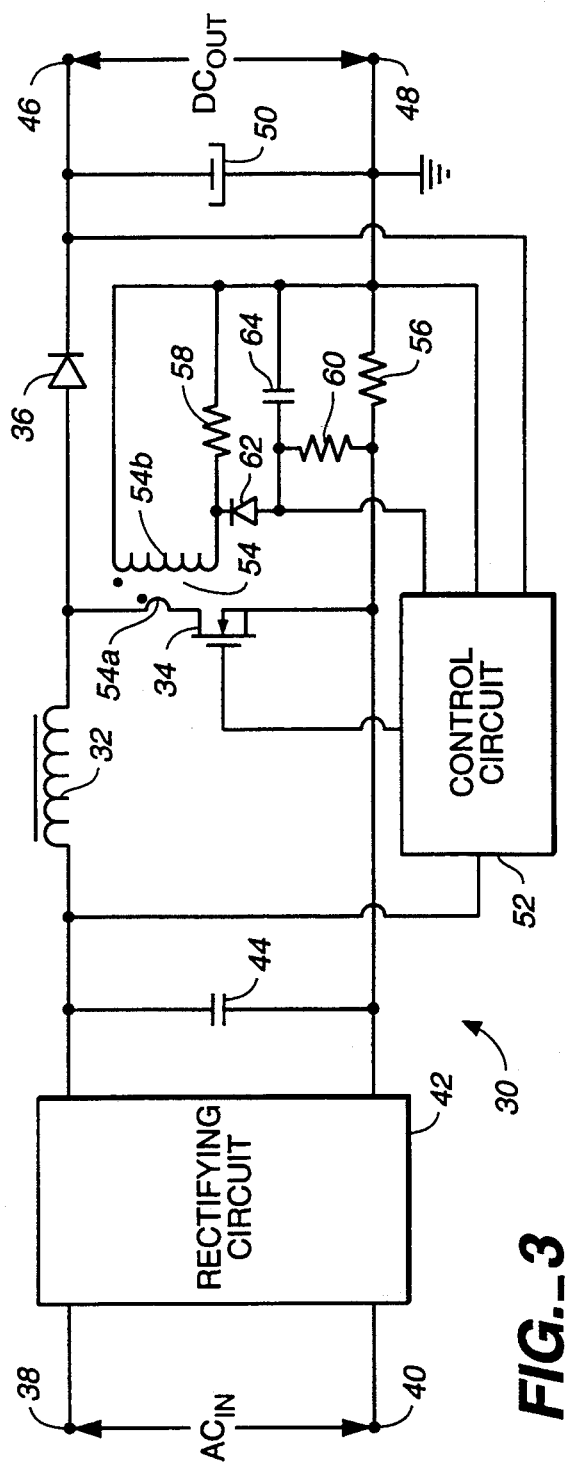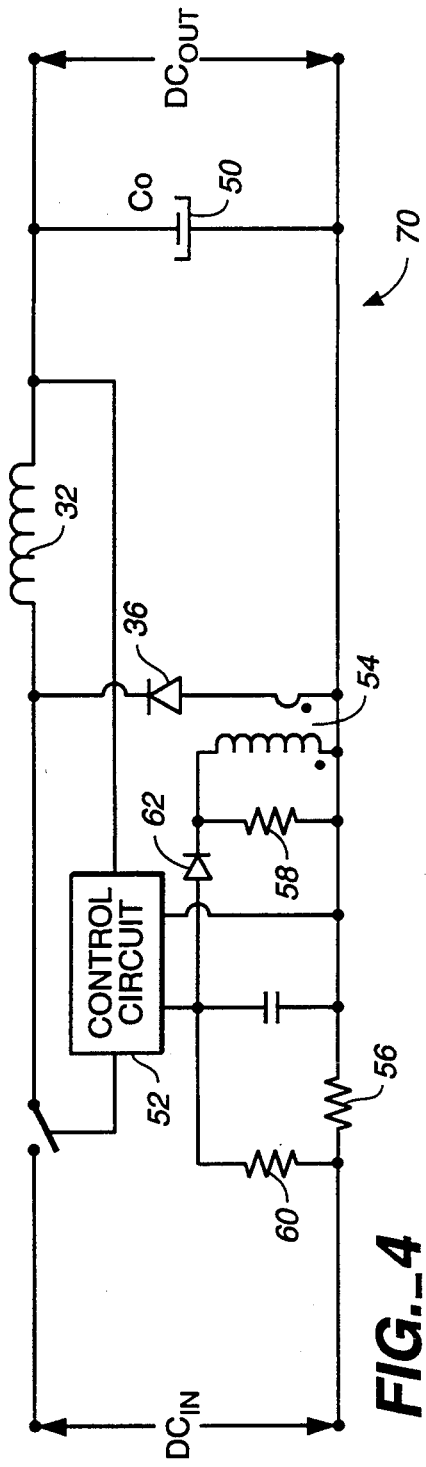

SWITCHING MODE POWER SUPPLIES

This application is a continuation of application Ser. No. 07/960,544, filed Oct. 13, 1992, now abandoned.

FIELD OF THE INVENTION

This invention relates to improvements in switching mode power supplies.

BACKGROUND OF THE INVENTION

In general terms, in a switching mode power supply an input voltage is modulated by a switch and the modulated waveform is passed through an inductance, rectified and filtered to provide an output of a controlled value. Such switching mode power supplies are very well known and examples of basic topologies are boost convertors, buck convertors and buck boost convertors.

In order to control the switching and therefore the output, it can be helpful to know the average current, or at least the peak current which is a fair approximation of the average current, passing through the inductor.

The current passing through the inductor can be measured directly by including a current sensing resistor in series with the inductor and measuring the voltage drop across that resistor. A problem with this solution, however, is that there are undesirable energy losses in the resistor. Also one cannot normally use a current sensing transformer in series with the inductor because this would become saturated by the DC component of the inductor current.

An alternative solution is to determine the currents flowing through the switch and the rectifier and to use those determinations to derive the current flowing through the inductor. This is possible because, irrespective of the relative positioning of the inductor, rectifier and switch, one has in effect three branches in the resulting electronic network, one containing the inductor, one containing the switch and one containing the rectifier, and all three branches have a common point so that the current in the branch containing the inductor will always be the combination of the currents through the switch and rectifier.

In order to determine the currents passing through the switch and rectifier, one could include current sensing resistors in series with each but this suffers from the problem noted above of undesirable energy losses and there would normally not be any advantage in using two resistors in place of a single resistor in series with the inductor. Therefore current sensing transformers have been included in series with these branches. This has cost and space disadvantages, however, since two are required and they are relatively large components.

The invention has therefore been made with these points in mind and it is an object of the invention to provide a compromise between these various factors.

SUMMARY OF THE INVENTION

According to the invention there is provided a switching mode power supply in which an input voltage is modulated by a switch and the modulated waveform is passed through an inductance, rectified and filtered to provide an output of a controlled value, and in which to determine the current passing through the inductance, the smaller of the root mean square (rms) current through the switch and the rms current through the rectifier is measured by including a current measuring resistor in series with that respective component, and the current through the other component is measured by including a current-sensing transformer in series with that component, the current through the inductor then being determinable as the combination of the other two currents. The RMS currents in the switch and rectifier may be determined by measurement techniques well known to the power supply art.

Such an arrangement can represent a good compromise between the cost of having two current measuring transformers and the power losses of having current measuring resistors. To minimize energy losses therefore one measures the lowest rms current using the current measuring resistor, which is a cheap and simple way of determining the current. Then, one uses a more expensive and larger current sensing transformer to detect the current passing through the other branch but since one only has to use one current sensing transformer, this can represent a saving in costs.

The invention has particular advantages when the duty cycle of the switch is significantly different from 50%. Thus in such a case the rms current through one branch will be significantly lower than that through the other branch and the current measuring resistor will be placed in the branch with the lower rms current so that energy losses can be minimized.

According to one embodiment of the invention the output from the current sensing transformer can be passed through a resistor to measure the voltage drop generated, a rectifier being provided to allow one-way passage of current through a first resistor, and a large value resistor being provided across the output of the transformer to reset it between cycles. The resulting output voltage generated across the first resistor can be combined with the voltage generated across the said current measuring resistor by positioning them in series and providing a capacitor across them, the potential developed across that capacitor being representative of the average current through the inductor. In that connection it is relatively easy to ensure that the two voltages are correctly scaled to match one another by a suitable choice of the turns ratio of the current measuring transformer and the relative values of the two resistors.

The invention has particular application to switching mode power supplies which have power factor control and where one uses a control technique requiring current sensing. The invention is however not exclusively limited to such switching power supplies and can work with any convertor where average current mode control is required to control for example the duty cycle and/or frequency of the switching.

As noted above the invention can be applicable to all types of switching mode power supply topologies including, for example, boost convertors, buck convertors and buck boost convertors.

Accordingly, it is an object of the present invention to provide a circuitry for accurately sensing the average current through a switching mode power supply which is both more compact and more efficient than prior art approaches.

This and other objects of the present invention will become apparent to those skilled in the art from the following detailed description of the invention, the accompanying drawings, and the appended claims.

BRIEF DESCRIPTION OF THE DRAWINGS

The invention will now be described, by way of example, with reference to the accompanying drawings, in which:

FIGS. 1A, 1B, and 1C are diagrams showing three different topologies for switching convertors;

FIG. 2 is a graph showing the currents existing in one of these topologies;

FIG. 3 is a circuit diagram of a boost convertor according to the invention; and FIG. 4 is a circuit diagram of a buck convertor according to the present invention.

DETAILED DESCRIPTION OF THE INVENTION

Referring to FIGS. 1A–1C, the three diagrams 1A, 1B and 1C in this Figure show the basic topologies of respectively, a boost convertor, a buck convertor and a boost buck convertor. All three include an inductance L through which current is switched by means of a switch S and a diode D rectifies the output. An input supply $V_{IN}$ is provided across input terminals 10 and 12 and a final DC output $V_{OUT}$ is provided across terminals 14 and 16.

In the boost convertor topology shown in FIG. 1A, an input current $I_3$ flows through the inductor L all the time that the switch S is closed. The magnetic energy increases during this period and then when the switch opens the stored energy is transferred as current passing through the diode D to the output $V_{OUT}$. In this arrangement a current $I_1$ flows through the switch, an output current $I_2$ flows through the diode D and the input current $I_3$ flows through the inductor L. By the nature of the arrangement of the components, inevitably current $I_3$ passing through the inductor is the combination of the currents $I_1$ and $I_2$.

For the buck convertor topology shown in FIG. 1B the positioning of the switch S, the diode D and the inductor L differs from the arrangement in the boost convertor shown in FIG. 1A. However the same rule still applies as regard the currents, in that the current $I_3$ passing through the inductor will be the combination of the currents $I_1$ and $I_2$. Again a similar situation exists for the buck boost convertor shown in FIG. 1C even though again the positions of the switch S, diode D and the inductor L are again different.

The switch S shown in the various switching power supplies shown diagrammatically in FIGS. 1A–1C will be an electronic switch such as a field effect transistor (FET). This switch will be switched very rapidly indeed so that even if the input $V_{IN}$ is not a steady figure, during the period of a single switching cycle, there will be insignificant change in the voltage $V_{IN}$. For example, the current $I_3$, which is the combination of the currents $I_1$ and $I_2$, may vary with time over a short time period as shown in the graph of FIG. 2.

In order to control the switching of the switch S, a suitable control circuit is provided which is not shown in the diagrams of FIGS. 1A–1C. However that control needs input information in the form of the currents $I_1$, $I_2$ and $I_3$, and so it is necessary to measure these currents in some way. However it is not necessary to measure all three currents and if one measures and determines currents $I_1$ and $I_2$, then one can uniquely determine current $I_3$ as well since, as is shown is FIG. 2, $I_3$ in the combination of currents $I_1$ and $I_2$.

FIG. 3 shows an off-line 500 watt input power boost power factor correction circuit 30. This circuit is constructed according to the invention and comprises an inductor 32, through which current is switched by a FET 34, the output from the inductor when the FET is "off" passes through a rectifier 36.

The circuit 30 is supplied with AC power at normal mains voltage across terminals 38 and 40. This input is rectified in a rectifying circuit 42, e.g. a full wave bridge, and smoothed by means of a capacitor 44. The resulting DC input is then applied to inductor 32. The DC output from the rectifier 36 passes to output terminals 46 and 48. A capacitor 50 across these terminals stores the power.

The switching of the FET 34 is under the control of a circuit 52. This can comprise a conventional power factor control chip which pulse width modulates the switching. It does, however, need input information in the form of the values of the currents passing through the inductor 32, switch 34 and rectifier 36. According to the invention the current $I_1$ passing through the FET 34 is sensed by means of the current sensing transformer 54, whose primary 54a is included in series with the FET 34, whilst the current $I_2$ passing through the rectifier 36 is sensed by determining the voltage drop across a resistor 56.

A resistor 58 is provided across the secondary 54b of the transformer 54 to reset it and a resistor 60 is provided through which the voltage developed across the secondary 54b passes, so developing a voltage drop to be measured and detected as corresponding to the current $I_1$. A diode 62 prevents return current through the resistors 56 and 60.

A capacitor 64 filters off by high frequency noise and the voltage developed across it corresponds alternately to $I_1$ and $I_2$ as in FIG. 2, and overall to their combination, is $I_3$.

Assuming that the input impedance of the control circuit 52 is much higher than the resistances of resistors 56 and 60, the current transformer 54 senses the current $I_1$ and this is processed by the diode 62 and resistors 56 and 60 and capacitor 64 over this period of time. The voltage developed across capacitor 64 will be equivalent to the sum of the resistances of resistors 56 and 60 times the turn ratio of the transformer 54 and times the switch current $I_1$, where the resistance of resistor 58 is much greater than the sum of the resistances of resistors 56 and 60. When current flows through the rectifier 36, the resistor 56 will sense current $I_2$ whilst the magnetizing energy in current transformer 54 is reset by the resistor 58. Because the diode 62 is non-conducting, the voltage drop across the resistor 60 will be insignificant.

Therefore the voltage across capacitor 64 will equal the resistance of resistor 56 times current $I_2$. Capacitor 64 filters the high frequency noise and the voltage developed across it re-constitutes the continuous current $I_3$ circulating in the inductor 32 without losing either the average or the ripple component of the sensed current.

Under low line (85 V) and full load conditions, the duty cycle of the pulse width modulation control circuit is set at 70%. Then, in the circuit 30 shown, the power lost in the current sensing circuit was found to be about 1.4 Watts instead of 4.5 Watts when the current was sensed by a single resistor.

FIG. 4 shows a power supply 70 according to the invention. Here a DC/DC buck convertor makes use of average current mode technique to enhance the performance of the convertor by reducing noise and controlling the currents in the various circuit branches.

Power supply 70 is supplied with a DC power input voltage across terminals 38' and 40'.

The equivalent components to the components shown in the circuit 30 of FIG. 3 are given the same references and the measurement of the currents $I_2$ is achieved in the same way as described in FIG. 3 to determine the current $I_3$ so that the control 52 can receive this information and control the circuit according to this. Separate description is therefore not felt to be necessary.

As the input voltage varies from say 28 to 32 volts, the maximum duty cycle under steady conditions is approximately 18%. To regulate a 5 volt 10 amp output, 1.2 Watts of power is lost in the current sensing circuit where the current transformer 54 is used to sense the current passing through the rectifier 36 and the resistor 56 is used to sense the current passing through the FET 34. In this circuit one can therefore avoid either two costly current transformers or the much larger losses of adopting two current measuring resistors or the equivalent single resistor measuring the inductor current $I_3$.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A switching mode power supply comprising: an inductance; a switch having alternating ON and OFF periods for coupling an input voltage to said inductance during said ON periods to cause a current to flow in said inductance; a rectifier for coupling the current flowing through said inductance to an output during the OFF periods of said switch, each of said switch and said rectifier having a respective current flowing therethrough and each said current having a respective root-means-square (RMS) value, one of said switch or said rectifier having a smaller RMS current value than the other thereof; and means for determining the current flowing through said inductance, said means including a current-sensing resistor coupled in series with the one of said switch or said rectifier having the smaller RMS current value for measuring the current flowing therethrough, and a current-sensing transformer coupled in series with the one of said switch or said rectifier having the larger RMS current value for measuring the current flowing therethrough, said current-sensing resistor and said current-sensing transformer generating respective representations of the sensed currents flowing therethrough such that said respective representations are combinable to provide a representation of the current flowing through said inductance.

2. A power supply as claimed in claim 1 further comprising a power factor control circuit responsive to said means for determining the current through said inductance for controlling the operation of said switch such that the power factor of said power supply is enabled to be controlled.

3. A power supply as claimed in claim 1 wherein said power supply comprises a boost converter.

4. A power supply as claimed in claim 1 wherein said power supply comprises a buck converter.

5. A power supply as claimed in claim 1 wherein said power supply comprises a buck boost converter.

6. The power supply of claim 1 wherein said means for determining the current flowing through said inductance further comprises a means for generating a representation of the current through said inductance from said representations of the sensed currents.

7. The power supply of claim 6 wherein said means for generating said representation of current through said inductance further includes a resistor coupled across said secondary winding for resetting said current-sensing transformer during the times when current is not conducted through the high RMS-current branch.

8. The power supply of claim 6 wherein the one of said switch or said rectifier having the smaller RMS current value comprises a low RMS-current branch and wherein the one of said switch or said rectifier having the larger RMS current value comprises a high RMS-current branch;

wherein said current-sensing transformer includes a primary winding and a secondary winding, said primary winding being coupled in series with the high RMS-current branch; and wherein said means for generating said representation of current through said inductance includes a circuit node where a voltage representation of the current through said inductance is generated, a series circuit comprising a first resistor, a rectifier, and said secondary winding which generates a voltage across said first resistor related to the current flowing through the high RMS-current branch when current flows through said high RMS-current branch, and means for coupled said voltage generated across said first resistor to said circuit node.

9. The power supply of claim 8 wherein said means for generating said representation of current through said inductance further includes means for coupling the voltage generated across said current-sensing resistor to said circuit node when current flows through said low RMS-current branch.

10. The power supply of claim 9 wherein said current-sensing resistor is coupled in series with said series circuit, and wherein said first resistor couples the voltage generated across said current-sensing resistor to said circuit node when current flows through said low RMS-current branch.

11. The power supply of claim 10 wherein a first terminal of said current-sensing resistor is coupled to a first terminal of said first resistor, wherein a second terminal of said first resistor is coupled to said circuit node, and wherein said means for generating said representation of current through said inductance further includes a capacitor coupled between said circuit node and a second terminal of said current-sensing resistor.

* * * * *